(12) United States Patent
Daughtrey

(10) Patent No.: US 7,409,643 B2
(45) Date of Patent: Aug. 5, 2008

(54) GRAPHICAL USER INTERFACE FOR TRAVEL PLANNING SYSTEM

(75) Inventor: Rodney S. Daughtrey, Cambridge, MA (US)

(73) Assignee: ITA Software, Inc., Cambridge, MA (US)

( * ) Notice: Subject to any disclaimer, the term of this patent is extended or adjusted under 35 U.S.C. 154(b) by 634 days.

(21) Appl. No.: 10/697,823

(22) Filed: Oct. 30, 2003

(65) Prior Publication Data

US 2004/0236616 A1   Nov. 25, 2004

Related U.S. Application Data

(63) Continuation of application No. 09/431,679, filed on Nov. 1, 1999, now Pat. No. 6,801,226.

(51) Int. Cl.
*G06F 3/00* (2006.01)

(52) U.S. Cl. ............... 715/763; 715/762; 715/764; 715/810; 715/838; 715/765; 705/6; 705/5

(58) Field of Classification Search ........ 715/763, 715/703, 157, 163, 737, 738, 739, 762, 810, 715/833; 705/6, 5, 26

See application file for complete search history.

(56) References Cited

U.S. PATENT DOCUMENTS

| | | | |
|---|---|---|---|
| 4,862,357 A | 8/1989 | Ahlstrom et al. | |
| 5,021,953 A | 6/1991 | Webber et al. | |
| 5,177,684 A | 1/1993 | Harker et al. | |
| 5,191,523 A | 3/1993 | Whitesage | |
| 5,237,499 A | 8/1993 | Garback | |
| 5,253,166 A | 10/1993 | Dettelbach et al. | |
| 5,255,184 A | 10/1993 | Hornick et al. | |
| 5,331,546 A | 7/1994 | Webber et al. | |
| 5,422,809 A | 6/1995 | Griffin et al. | |
| 5,559,707 A | 9/1996 | DeLorme et al. | |
| 5,644,721 A | 7/1997 | Chung et al. | |
| 5,784,583 A | 7/1998 | Redpath | |
| 5,786,816 A | 7/1998 | Macrae et al. | |
| 5,794,172 A | 8/1998 | Matheson et al. | |
| 5,797,127 A | 8/1998 | Walker et al. | |
| 5,826,237 A * | 10/1998 | Macrae et al. | ............... 705/2 |
| 5,832,454 A | 11/1998 | Jafri et al. | |
| 5,838,973 A | 11/1998 | Carpenter-Smith et al. | |
| 5,850,221 A * | 12/1998 | Macrae et al. | ............ 715/853 |

(Continued)

OTHER PUBLICATIONS

Harniman, Brian, Online Travel Sites: Where Do You Really Want to Go Today?, My Mac Magazine Online, Issue #24, Apr. 1997.

(Continued)

*Primary Examiner*—Weilun Lo
*Assistant Examiner*—Mylinh Tran
(74) *Attorney, Agent, or Firm*—Fish & Richardson P.C.

(57) ABSTRACT

A graphical user interface for a travel planning system is described. The graphical user interface is implemented as a web page and includes a tabular region of the graphical user interface that displays summarized travel options and comprises a plurality of cells that act as controls. The interface also includes a second region that displays selected travel options resulting from filtering a set of travel options in accordance with a control actuated in the tabular region.

47 Claims, 7 Drawing Sheets

U.S. PATENT DOCUMENTS

| | | |
|---|---|---|
| 5,897,620 A | 4/1999 | Walker et al. |
| 5,948,040 A | 9/1999 | DeLorme et al. |
| 6,307,572 B1 * | 10/2001 | DeMarcken et al. ........ 715/763 |
| 6,360,205 B1 | 3/2002 | Iyengar et al. ................. 705/5 |
| 6,442,526 B1 | 8/2002 | Vance et al. ................... 705/5 |

OTHER PUBLICATIONS

Internet Archive Wayback Machine: Jan. 30, 1997, http: www.expedia.com.

Definition of tabular—Merriam-Webster Online Dictionary; http://www.m-w.com/dictionary/tabular.

* cited by examiner

Depart: Boston to New York area

| | Thur, Oct 28, midnight-6am | Thur, Oct 28, 6am-noon | Thur, Oct 28, noon-6pm | Thur, Oct 28, 6pm-midnight |
|---|---|---|---|---|
| Low fares from $376 | | | | |

Return: New York area to Boston

| Thur, Nov 4 6am-noon | Thur, Nov 4 noon-6pm | Thur, Nov 4 6pm-midnight |
|---|---|---|
| From $378 | From $378 | From $378 |
| From $376 | From $378 | From $378 |
| From $376 | From $376 | From $378 |
| From $376 | From $376 | From $376 |

All options

| # | Details | Price | Airline | From/To | Date | Flight times | Stops | Duration | Notes |
|---|---|---|---|---|---|---|---|---|---|
| 1 | Details | $376 | American Airlines + others | BOS to LGA / JFK to BOS | Thur, Oct 28 / Thur, Nov 4 | 6:00a-6:59a / 7:35a-8:38a | non-stop / non-stop | 59m / 1h 3m | - - |
| 2 | Details | $376 | American Airlines + others | BOS to LGA / JFK to BOS | Thur, Oct 28 / Thur, Nov 4 | 1:30p-2:29p / 7:35a-8:38a | non-stop / non-stop | 59m / 1h 3m | - - |
| 3 | Details | $376 | American Airlines + others | BOS to LGA / JFK to BOS | Thur, Oct 28 / Thur, Nov 4 | 9:30p-10:29p / 7:35a-8:38a | non-stop / non-stop | 59m / 1h 3m | - - |
| 4 | Details | $376 | American Airlines + others | BOS to LGA / JFK to BOS | Thur, Oct 28 / Thur, Nov 4 | 6:00a-7:00a / 7:35a-8:38a | non-stop / non-stop | 1h 0m / 1h 3m | - - |

FIG. 4

GRAPHICAL USER INTERFACE FOR TRAVEL PLANNING SYSTEM

This application is a continuation application of and claims the benefit of U.S. patent application Ser. No. 09/431,679 filed Nov. 11, 1999, now U.S. Pat. No. 6,801,226.

BACKGROUND

This invention relates generally to computerized travel planning systems.

Travel planning systems are used to produce itineraries and prices by selecting suitable travel units from databases concerning geographic scheduling and pricing information. In particular, travel planning systems that operate over the Internet are known. Some computer travel planning systems, such as Internet sites, generally produce a set of planning options, or itineraries for the traveller to consider. These options are often in the form of a single list of the possible itineraries from which the traveller may select. Such a display approach makes it difficult to clearly compare, discriminate, focus, and assimilate criteria and information that are likely to be important to the traveller.

SUMMARY

According to an aspect of the invention, a graphical user interface for a travel planning system includes a tabular region of the graphical user interface that displays summarized travel options and comprises a plurality of cells that act as controls and a second region that displays selected travel options resulting from filtering a set of travel options in accordance with a control actuated in the tabular region.

According to a further aspect of the invention, a method for displaying travel options includes compartmentalizing travel options into bins according to a set of criteria. The invention has compartmentalizing travel options into 'bins', according to a set of criteria through displaying the resulting bins in a table.

One or more of the following advantages may be provided by one or more aspect of the present invention.

With a summary table as part of a user interface to the travel planning system, travellers can select individual bins inorder to focus on a subset of travel options that they are interested in. Selecting an individual cell displays a secondary level of information about the travel options that are represented in that cell. In this secondary level of information about individual travel options, each travel option has a mechanism for selecting and displaying the details of that specific travel option. The summary table can appears in the top frame of a web browser.

BRIEF DESCRIPTION OF THE DRAWINGS

FIGS. 3-5 are diagrams of web pages depicting results of executing a query for a round trip based on information entered through the query screen of FIG. 2.

DESCRIPTION

Figure 1:
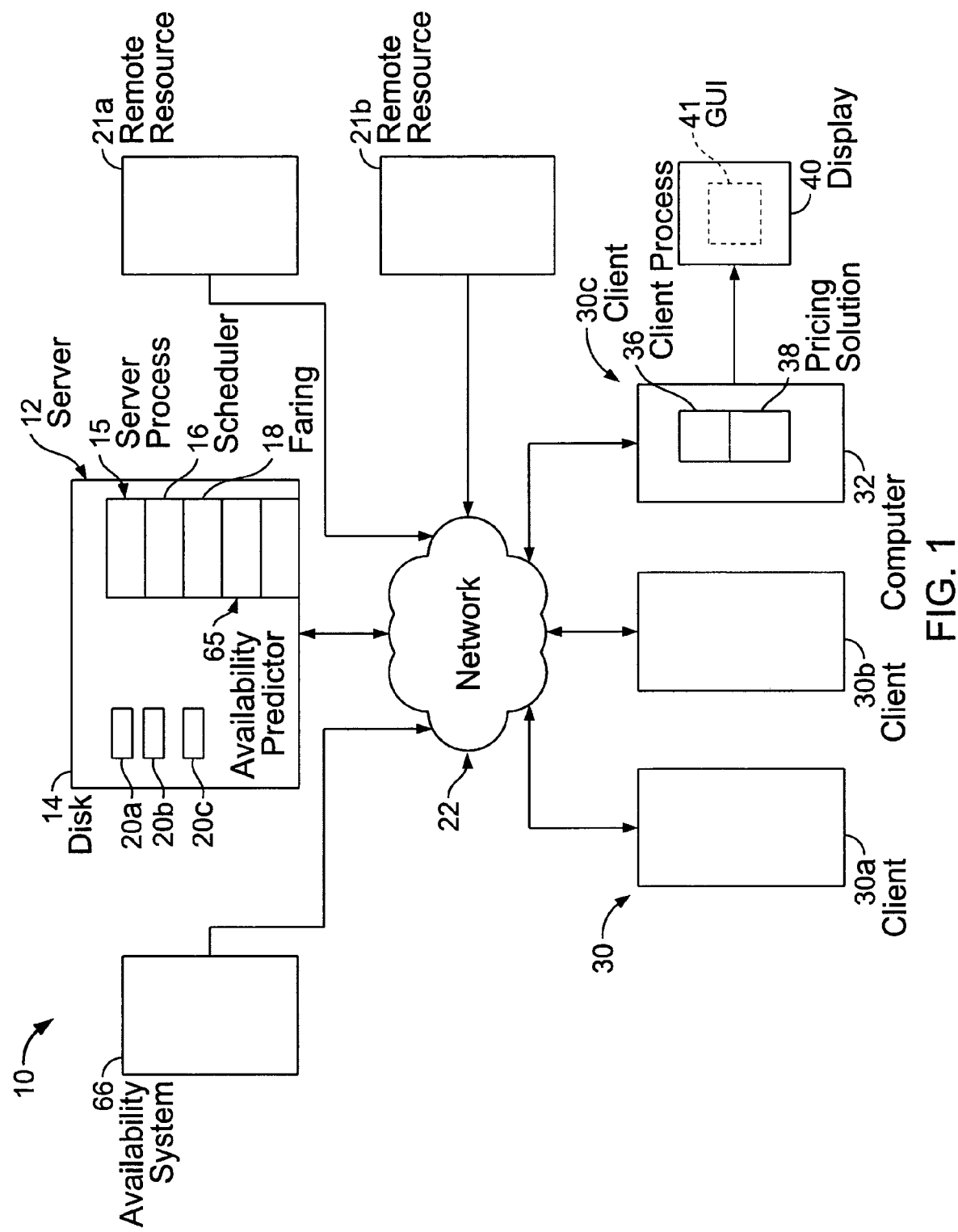
FIG. 1 is a block diagram of a client server travel planning system particularly operable over the Internet.

Referring to FIG. 1, a travel planning system 10 is shown. The travel planning system 10 can be used with various forms of travel such as airline, bus and railroad and is particularly adapted for air travel. Travel system 10 can include a server computer 12 having a computer memory or storage media 14 storing a server process 15. The server process 15 can include a scheduler process 16 and a faring process 18. An example of a scheduler process 16 is described in copending U.S. patent application Ser. No. 09/109,622, entitled "Scheduler System for Travel Planning Systems", filed on Jul. 2, 1998 by Carl G. DeMarcken et al. and assigned to the assignee of the present invention and incorporated herein by reference. Also an example of a faring process 18 is described in copending U.S. patent application Ser. No. 09/109,873, entitled "Graphical User Interface for Travel Planning System", filed on Jul. 2, 1998 by Carl G. DeMarcken et al and also assigned to the assignee of the present invention and incorporated herein by reference. As described in the incorporated references, the system 10 can include databases 20a-20b and these databases 20a-20b are typically stored locally and updated periodically by accessing remote resources 21a, 21b that maintain the respective databases. The system 10 can also include a plurality of clients 30a-30c coupled to the server 12 via a network 22. The network 22 can be any local or wide area network or an arrangement such as the Internet. Other travel planning systems such as those on the Internet can also be used.

The scheduler process 16 provides itineraries to a faring process 18. The faring process provides a set of pricing solutions by finding valid fares corresponding to the itineraries produced by the scheduler process 16. The faring process 18 also validates the fares for inclusion in a set of pricing solutions. The information to have the server produce the set of pricing solutions is obtain from a user entering data in a graphical user interface 41 displayed on a display 40 as will be described below. In addition, the set of pricing solutions are also displayed to the user through the graphical user interface.

Figure 2:
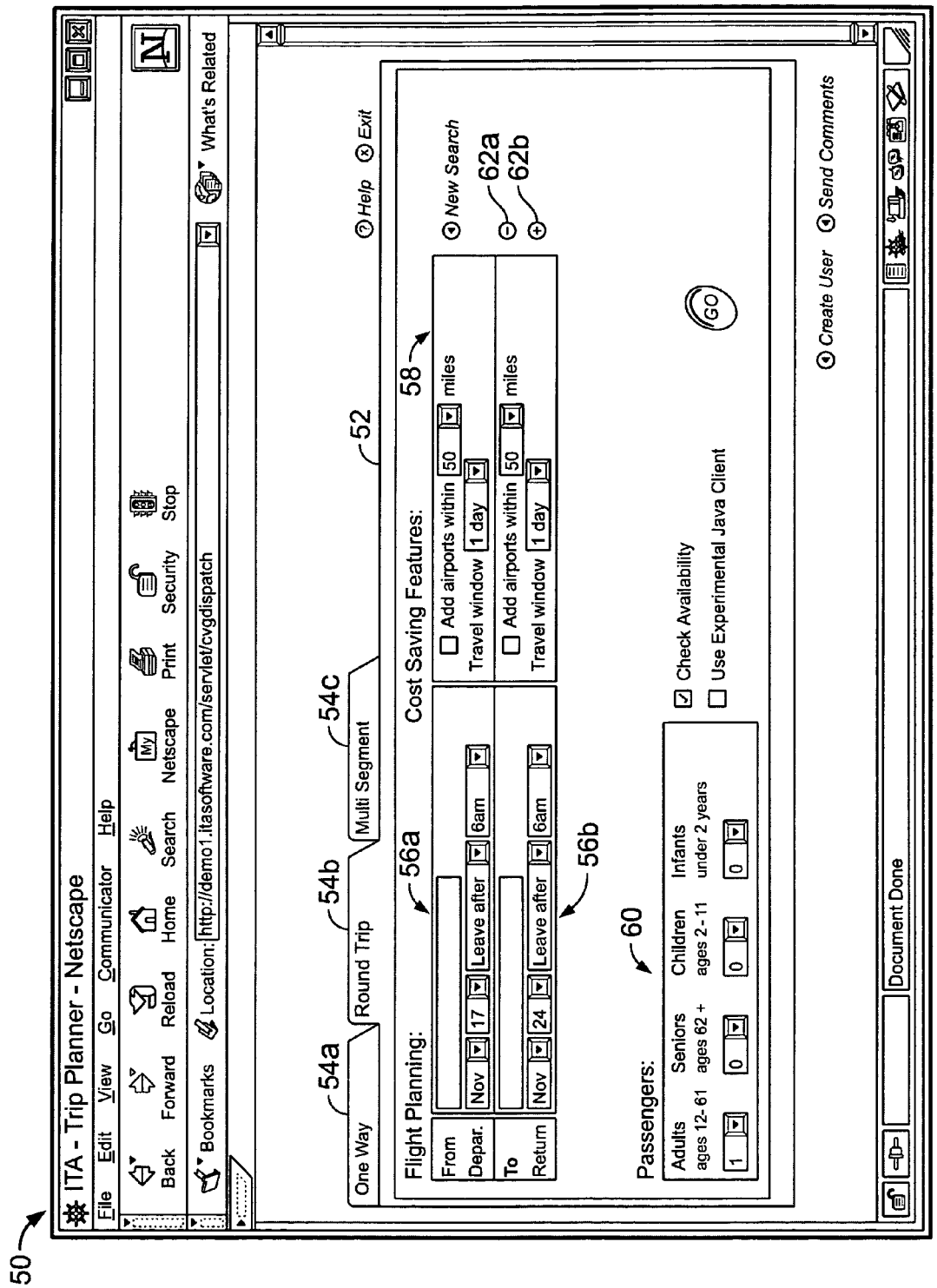
FIG. 2 is a diagram of a query screen for a graphical user interface implemented as a web page from a web browser.

Referring now to FIG. 2, a web page 50 that is part of a graphical user interface for the client process 36 is shown. The web page 50 allows the user to construct a query which can be executed by the server process 16 to produce flight plan options for the user.

The web page 50 includes a query table 52 which is a tab table 54 here comprised of three tabbed regions 54a-54c. The first tab is labeled one-way, the second tab round trip 54b and the third tab multi-segment 54c. The multi-segment tab is shown and is substantially the same as the other tabs except that the multi-segment tab allows the user to enter data for multiple segments of a flight by allowing the user to construct a new query segment region. For example, as shown in FIG. 2, the table includes a region 56a for entering flight information for a first segment of a flight. The information includes an origin to a destination and information concerning dates and time of travel. The query also allows the user to specify some potential cost saving feature by allowing the user to cause the server to look for other airports within 50 miles of a designated airport and include such other airports in answers for the segment. It also allows a user to specify a travel window. The table 54 also includes a second region 56b for entering similar information for a second segment and includes controls 62a and 62b for either removing a segment from the query or adding a segment to the query, thus allowing a user to provide a complex arrangement of segments corresponding to multi-segmented flights.

The web page 50 also allows for entry of passenger information such as the number of adults, seniors, children and infants which may be important in determining the fare price for a ticket. The web page 50 also allows a user to have the server process check seat availability on designated flights. With the check availability box activated, the server process 16 will return travel options for which there is seat availability.

Figure 3:
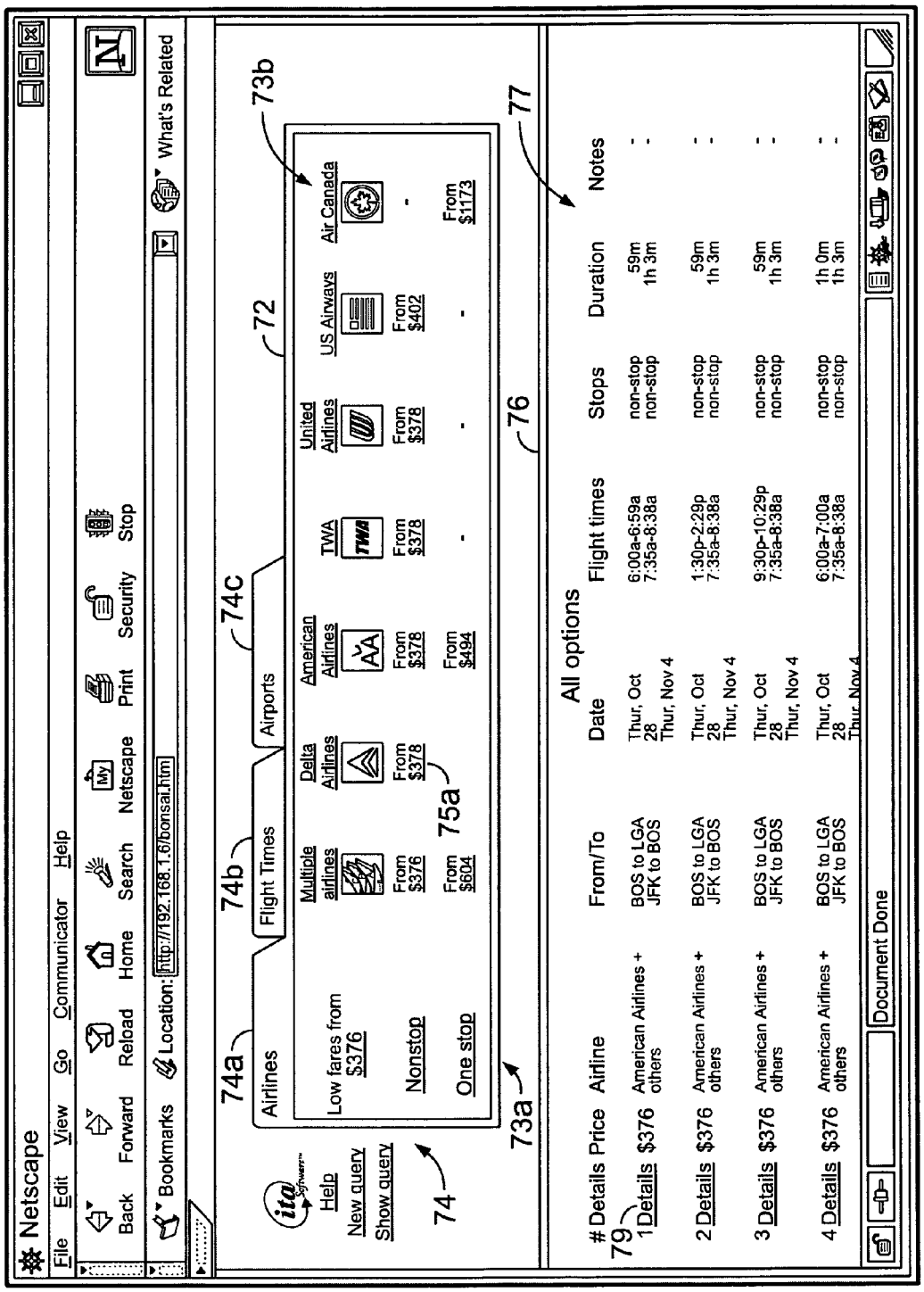

Referring now to FIG. 3, a web page 70 that depicts results from the server process 16 executing a query entered via the query page (FIG. 2) is shown. The web page 70, includes a table 72 that summarizes travel options. The travel option summary table 72 is a tab table comprised of a tab 74*a* that groups summary information by airlines, a tab 74*b* that groups summarized information by flight times and a tab 74*c* that summarizes travel information by airports.

Figure 5:
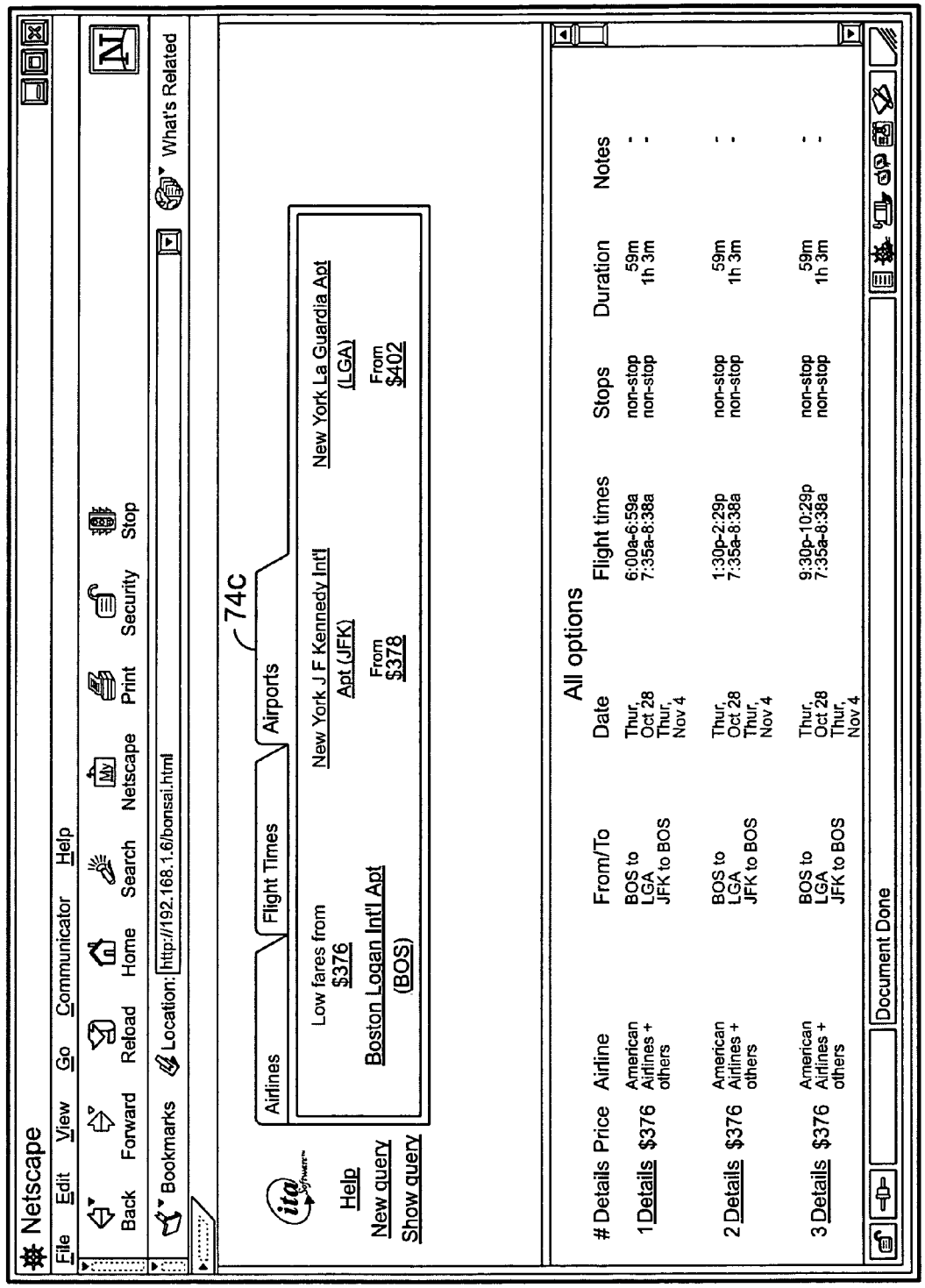

As shown in FIG. 3, with the airline tab 74*a* selected, the summary information in the table is arranged in rows and columns with each of the airlines arranged in columns of the table as links and each of the rows of the table 72 arranging specified travel options such as nonstop flights or one-stop flights, as links. Interior cells within the table 72 are links which correspond to prices for each of the airlines with respect to each of the travel options. The table displays a set of air travel options according to specified criteria, e.g., the airlines used in one or more of the travel options (displayed from left to right at the top of the table), and the number of stops or connections in the set of travel options. Here, the travel options represented by a given table cell are those options which use the airline in the same column as that cell, and that have the same number of stops as the "number of stops" header in the same row as that cell. A third criterion, price (i.e. price of an airline ticket), is displayed in each cell of the table; this price is the minimum price for any of the travel options that are represented by a given cell. Selecting a cell (by clicking on a URL in this case) displays, in the lower pane, a listing of the travel options for that particular cell. Each travel option contains a 'details' URL link in the row of information devoted to that travel option; clicking on that link takes the traveler to yet a third level of information, a detailed description of that travel option as shown in FIGS. 4 and 5.

A general procedure to construct the graphical user interface is given below:
1) Obtain list of query-specific travel options.
2) For each criteria in travel options:
   Enumerate bins for the criteria
   For each travel option T:
     Place travel option T into some bin
3) Given the bins computed in (2), compute intersections of bins to determine what bins go in what cells of the summary table
4) Generate and display summary table given information from procedure (3).

If the travel system operates on a pricing graph, the links are hyperlinks to an enumeration algorithm such as described in the copending application which can sort through a pricing graph, as described in the above application, and return a set of travel options which correspond to the intersection of here the airline represented in the column and the travel option represented in the selected row. Otherwise the links activate routines to sort through a list of travel options.

Figure 6:
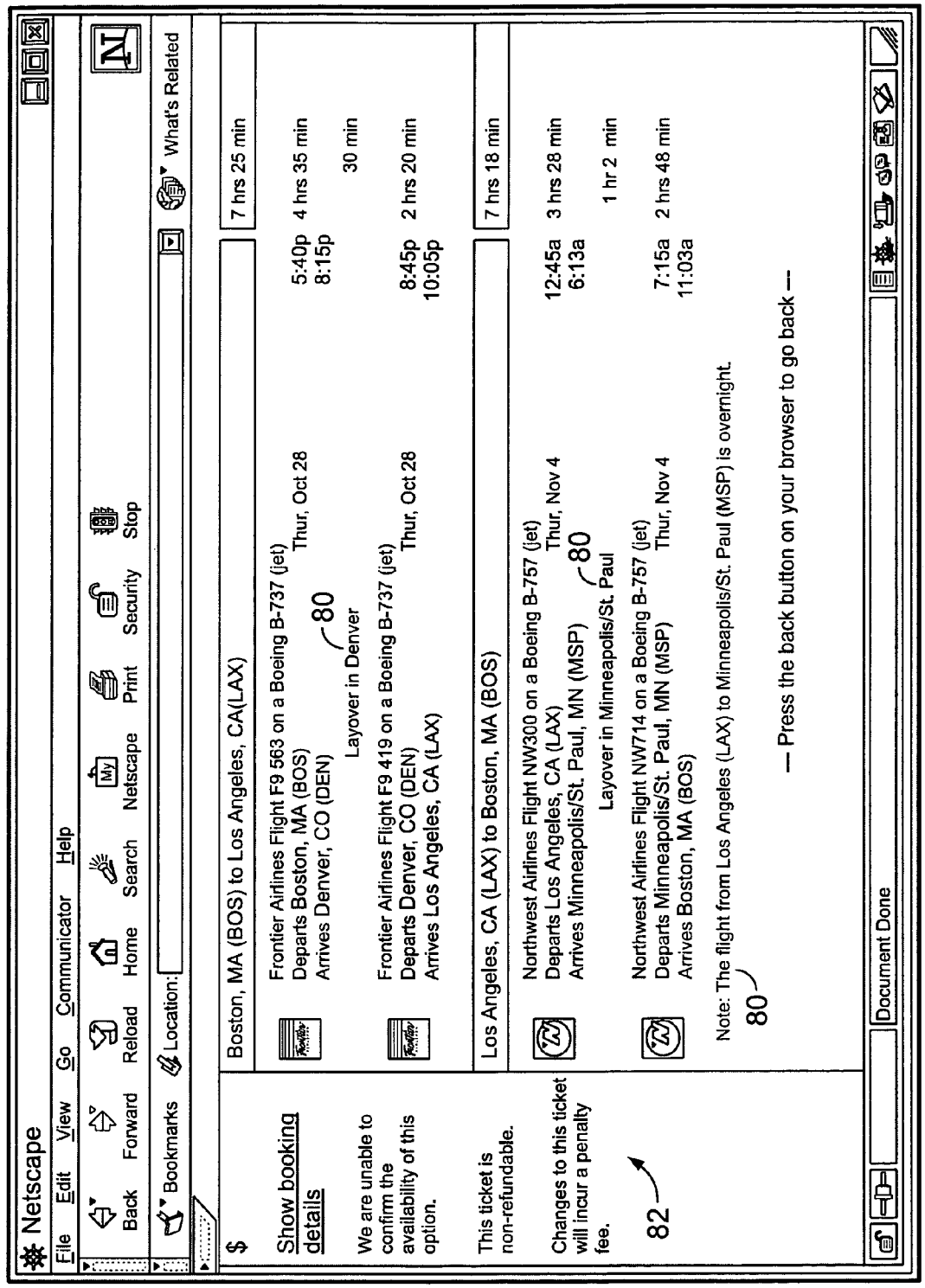
FIGS. 6 and 7 are diagrams of web pages depicting details of travel options provided in the web pages of FIGS. 3-5.
Figure 7:
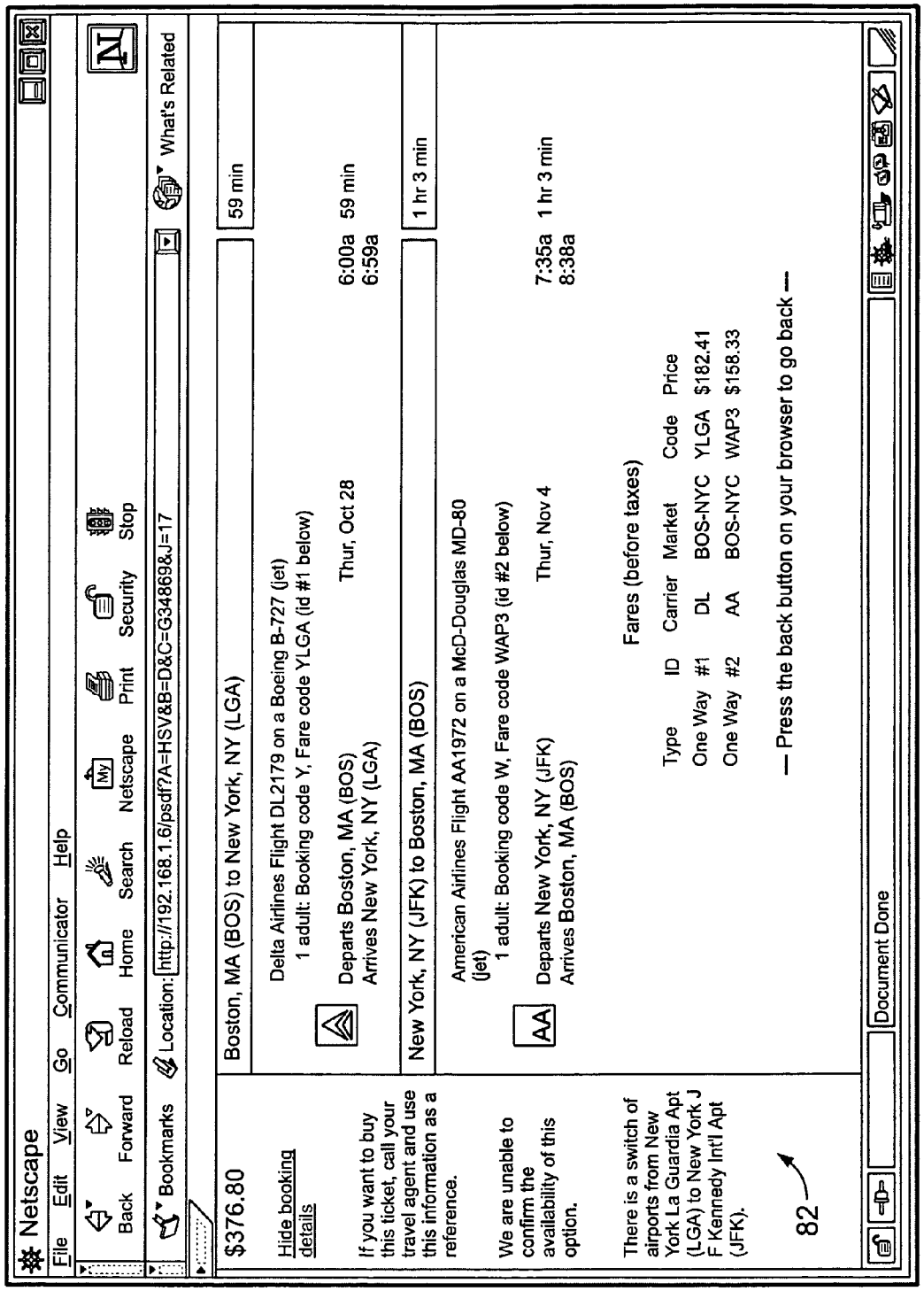

Thus, for example, selecting cell 75*a* which has value of $378 will bring up all non-stop options on Delta Airlines, e.g., no stops in any segment and depict the top 30 of those results in the results frame 76. Thus, the links in the table 72 are used to control the display of travel options in the results frame 76. The results frame 76 includes a plurality of results, here the top 30 results are typically shown, arranged in a table with a hyperlink denoted as "details" which, when activated, brings up details of the travel option such as shown in FIG. 6. FIG. 6 also has a second link which, when activated, brings up booking details as shown in FIG. 7. FIGS. 6 and 7 in addition to showing details of the travel option also shows warnings 80 and planning suggestions 82.

Returning to FIG. 3, the table 72 allows the display of summary information in different manners depending on which tab is selected.

As shown in FIG. 4, when the flight time tab 74*b* is selected, the table 72 is arranged to show departure times between the origin and the destination over ranges of times for the potential days of travel in the outbound portion of the trip in rows of the table, as well as departure time for the return portion of the trip in columns of the table 72 over time ranges in the potential return days. Thus, selecting one of the outer peripheral cells of the table will bring up all flight options on a designated day in the designated time area; whereas selecting an interior cell will produce the intersection of options for a time segment on the selected outbound date and the time segment of the selected return date. The table 72 also depicts the starting or lowest fares for each one of the different time segments allowing a user to decide the most appropriate time to travel giving considerations such as cost and convenience.

As shown in FIG. 5, when the airport tab 74*c* is selected, the summary table has columns corresponding to destination airports and rows corresponding to origin airports.

The summary table 72 segments or compartmentalizes travel options into bins, according to criteria that the user might use to select a specific travel option. Each dimension of the table has a travel criterion associated with it (for example, a two-dimensional table would have a criterion along the horizontal rows of the table, and a criterion along the vertical columns of the table). In addition, another, different criterion is represented in the cells of the table. The process for producing a summary table, given a set of travel options and a set of criteria, is given below. For example, other criteria could be used within the interior cells or at the edges of the table.

The graphical user interface is populated by obtaining a list of query-specific travel options. For each criteria the process will enumerate bins for this criteria, and for each travel option T, the process places the travel option T into some bin. Given the bins computed the process computes intersections of bins to determine what bins go in what cells of the summary table. The process generates and displays the summary table with the determined information.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:
1. A display rendering a graphical user interface for a travel planning system, the graphical user interface comprises:
  a tabular region having a plurality of cells, the tabular region comprising cells arranged in plural columns and plural rows with the cells displaying a summary of a criterion of a set of travel options, and with the cells being controls that when selected, provide a subset of the travel options that correspond to the respective criterion or criteria of the selected cell; and
a second region that displays aspects of the subset of the travel options resulting from selecting the respective cell in the tabular region.

2. The display of claim 1 wherein interior cells that intersect at least one column and at least one row displaying a value that summarizes travel options that meet a pair of criteria according to the criterion in a respective one of the columns and the criterion in a respective one of the rows.

3. The display of claim 1 wherein the controls in the tabular region arranged in columns and where upon actuation of one of the controls in a column that is an exterior column causes results to be displayed in the second region as a grouping of travel options according to the criterion corresponding to the exterior column.

4. The display of claim 1 with actuation of one of the controls in one of the rows or columns on the periphery of the tabular regions the results to be displayed in the results region as a grouping of travel options in accordance with a summary of a criterion corresponding to the selected control.

5. The display of claim 1 wherein upon actuation of one of the controls that is an interior one of the cells in the rows and columns, causes the results to be displayed as a grouping of travel options in accordance with criteria corresponding to the intersection of a corresponding row and a corresponding column.

6. The display of claim 1 wherein the controls are links to routines that invoke an appropriate enumeration algorithm.

7. The display of claim 6 wherein the interface is implemented as a web page and the controls are hyperlinks to the enumeration routines.

8. The display of claim 1 wherein the tabular region is a tabbed table comprising at least one of an airline tab, an airport tab and a flight time tab.

9. The display of claim 1 wherein the graphical user interface is represented in a first web page and the results region displays itineraries and includes links that invoke a second web page to display details of the itineraries.

10. A method for displaying travel options comprises:
compartmentalizing travel options into bins according to a set of criteria of the travel options; and displaying a summary of the travel options in a table rendered in a graphical user interface according to the bins with the criteria associated with the bins as cells in the table.

11. The method of claim 10 wherein displaying a summary comprises:
displaying criteria associated with the bins in a two-dimensional table, with one criterion assigned to each dimension of the table.

12. The method of claim 10 wherein displaying a summary comprises:
displaying criteria associated with the bins in a two-dimensional table, with one criterion assigned to each dimension of the table, and with a third criterion depicted in interior cells of the table.

13. The method of claim 10 wherein the criteria involved include one or more airlines or other carriers of passengers, number of stops that the carrier makes en route to destinations, departure times, arrival times, time ranges, carriers involved in travel options, locations that carriers depart or arrive from, cost of travel options, ticket restrictions and airline safety records.

14. The method of claim 13 wherein a third criterion is depicted in each cell that is an interior cell of the table.

15. The method of claim 10 further comprising:
selecting a cell from the table; and
producing specific information related to that cell; and
presenting the produced information in a user interface.

16. The method of claim 15 wherein the information is a listing of travel options.

17. The method of claim 10 wherein displaying a summary in the graphical user interface comprises:
displaying the display as a tabbed table, a first tab being an airline tab a second tab being airport tab and a third tab being a flight time tab, with each tab including a tabular region that displays summarized criteria of the set of travel options as a plurality of cells that act as controls according to the bins; and
actuating one of the controls to display selected travel options in accordance with the bin corresponding to the control.

18. The method of claim 10 wherein the table is a tabbed table having a plurality of tabs and displaying a summary comprises:
displaying the bins in a first tab of the table with one criterion assigned to each of two dimensions of the table and with an additional criteria depicted in corresponding additional ones of the plurality of tabs of the tabbed table.

19. A display rendering a graphical user interface for a travel planning system, the graphical user interface comprises:
a tabular region of the graphical user interface that displays criteria of a set of travel options as a plurality of cells that act as controls, which when selected, displays aspects of a subset of the travel options according to a criterion or criteria corresponding to the control selected.

20. The display of claim 19 wherein the controls in the tabular region are arranged in a rectangular manner.

21. The display of claim 19 wherein the controls in the tabular region are arranged in a column, and where upon actuation of one of the controls in the column, causes results to be displayed as a grouping of travel options according to a criterion of the set of travel options, with the criteria corresponding to the actuated control.

22. The display of claim 19 wherein the controls in the tabular region are arranged in rows and columns and wherein, upon actuation of one of the controls in a peripheral one of the rows or columns, causes the results to be displayed as a grouping of travel options in accordance with the criterion corresponding to the one control.

23. The display of claim 19 wherein the controls in the tabular region are arranged in rows and columns and wherein, upon actuation of one of the controls that is an interior one of the cells in the rows and columns, causes the results to be displayed as a grouping of travel options in accordance with criteria corresponding to the intersection of a corresponding row and a corresponding column.

24. The display of claim 19 wherein the controls are links to routines that invoke an appropriate enumeration algorithm.

25. The display of claim 19 wherein the tabular region is a tabbed table comprising at least one of an airline tab, an airport tab and a flight time tab.

26. A computer program product residing on a computer storage medium for displaying travel options comprises instructions for causing a computer to:
compartmentalize travel options into bins according to a set of criteria; and
display a summary of the travel options in a table rendered in a graphical user interface according to the bins with the criteria associated with the bins as cells in the table.

27. The computer program product of claim 26 wherein instructions to display a summary comprises instructions to:
 display criteria associated with bins in a two-dimensional table, with one criterion assigned to each dimension of the table.

28. The computer program product of claim 26 wherein instructions to display a summary comprises instructions to:
 display criteria associated with the bins in a two-dimensional table, with one criterion assigned to each dimension of the table, and with a third criterion depicted in interior cells of the table.

29. The computer program product of claim 26 wherein the criteria include one or more of airlines or other carriers of passengers, number of stops that the carrier makes en route to destinations, departure time, arrival times, time ranges, carriers involved in travel options, locations that carriers depart from or arrive at, cost of travel options, ticket restrictions and airline safety records.

30. A computer program product residing on a computer storage medium for rendering a graphical user interface for displaying travel options comprises instructions for causing a computer to:
 display a tabular region having a plurality of cells arranged, the tabular region having the cells arranged in plural columns and plural rows with the cells displaying criteria of a set of travel options, and with the cells being controls that when selected, provide a subset of the travel options that correspond to the respective criterion or criteria of the selected cell; and
 display a second region of aspects of selected travel options resulting from selecting the respective cell in the tabular region.

31. The computer program product of claim 30 wherein the criteria comprise a carrier, a departure location, an arrival location, a departure time, an arrival time, a trip duration, a number of stops or a travel date.

32. The computer program product of claim 30 further comprising instructions to:
 display a listing of the subset of travel options associated with selecting the control.

33. The computer program product of claim 30 wherein the tabular region has criteria further arranged as tabbed windows.

34. The computer program product of claim 30 wherein the second region is part of a common window with the tabular region juxtaposed with the tabular region.

35. The computer program product of claim 34 further comprising instructions to:
 display a listing of the subset of travel options associated with selecting the control.

36. The computer program product of claim 32 further comprising instructions to:
 display with the control a value of a third criterion.

37. The computer program product of claim 32 further comprising instructions to cause an operating system of the computer to:
 display the interface on a output device.

38. A method for generating a graphical user interface, the method comprising:
 receiving travel options;
 determining bins for criteria included in the travel options;
 associating the travel options with the bins according to the criteria;
 determining intersections of the bins according to the criteria;
 generating a table based at least in part on the intersections of the bins; and
 displaying the table as a graphical user interface with dimensions of the table corresponding to the bins determined according to the criteria.

39. The method of claim 38 wherein a bin comprises a value associated with a respective criterion.

40. The method of claim 38 wherein displaying the table displays the table with each of the bins rendered as elements in the table.

41. The method of claim 40 further comprising displaying an associated subset of the travel options when one of the elements is selected.

42. The method of claim 38 wherein a bin comprises a range of values associated with a respective criterion.

43. A computer program product for generating a graphical user interface, the computer program product residing on a computer storage medium and comprising instructions for causing a computer to:
 receive travel options;
 determine bins for criteria included in the travel options;
 associate the travel options with the bins according to the criteria;
 determine intersections of the bins according to the criteria;
 generate a table based at least in part on the intersections of the bins; and
 display the table as a graphical user interface with dimensions of the table corresponding to the bins determined according to the criteria.

44. The computer program product of claim 43 wherein a bin comprises a value associated with a respective criterion.

45. The computer program product of claim 43 wherein displaying the table displays the table with each of the bins rendered as elements in the table.

46. The computer program product of claim 45 further comprising instructions to:
 display an associated subset of the travel options when one of the elements is selected.

47. The computer program product of claim 43 wherein a bin comprises a range of values associated with a respective criterion.

* * * * *